United States Patent [19]

Sharp

[11] 3,932,953

[45] Jan. 20, 1976

[54] EXTENSIBLE SHAFTS AND FISHING SPEARS

[76] Inventor: Richard William Sharp, 89 Ngamotu Road, New Plymouth, New Zealand

[22] Filed: Mar. 18, 1975

[21] Appl. No.: 559,613

[30] Foreign Application Priority Data

Apr. 1, 1974   New Zealand.......................... 173873

[52] U.S. Cl......................... 43/6; 294/19 R; 294/61
[51] Int. Cl.².......................................... A01K 81/04
[58] Field of Search ............... 43/6, 5; 294/19 R, 61

[56] References Cited
UNITED STATES PATENTS

| | | | |
|---|---|---|---|
| 1,121,657 | 12/1914 | Parker............................ | 294/19 R X |
| 1,755,646 | 4/1930 | Halstead............................ | 294/61 X |
| 2,717,466 | 9/1955 | André........................................ | 43/6 |
| 3,354,572 | 11/1967 | Dean........................................ | 43/6 |

Primary Examiner—Louis G. Mancene
Assistant Examiner—Daniel J. Leach
Attorney, Agent, or Firm—Ladas, Parry, Von Gehr, Goldsmith & Deschamps

[57] ABSTRACT

A telescopically extensible and collapsible shaft, particularly for such as an underwater hand spear for spearing fish, with an arrangement for locking or rigidly securing the shaft in the extended position including a cylindrical extension part telescopically located in a tubular main part and having liquid seal means between the extension part inner end and the main part. A butt end piece is adapted to close the end of the main part remote from the end through which the extension part extends and has an inlet passage whereby water can be drawn into the main tubular part on extension of the extension part (and subsequently ejected on telescopically collapsing the extension part into the main part), the butt end piece being adjustable relative to the main part to open the inlet passage for the admission of water and closed to seal the water in the extended shaft.

9 Claims, 4 Drawing Figures

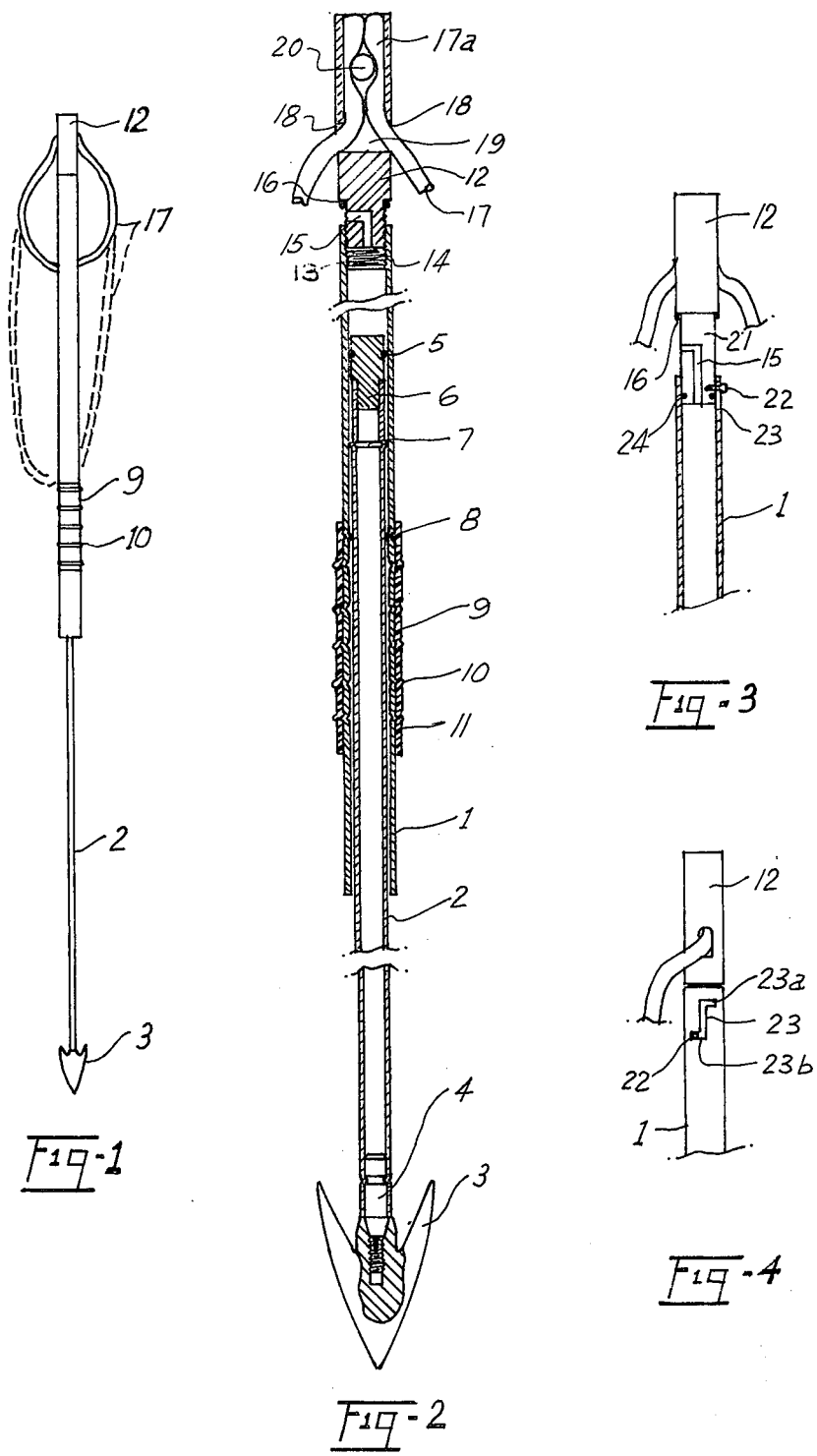

EXTENSIBLE SHAFTS AND FISHING SPEARS

This invention relates to extensible shafts, and more particularly relates to telescopically extensible shafts such as may be usable in the construction of a hand spear for use underwater in spearing a fish and the like. Although it will be appreciated on reading the specification that the invention may have other applications.

An object of this invention is to provide a telescopically extensible shaft with a simple and effective means for locking the shaft in the extended position and with a minimum risk of the locking means jamming to prevent either extension or telescopically collapsing of the shaft, as can happen with telescopically extensible shafts having mechanical locking means.

A still further object of this invention is to provide a telescopically extensible shaft particularly suitable for use in the construction of a hand spear for underwater use by a diver.

Other objects and advantages of the invention will become apparent from the ensuing description.

According to a first aspect of this invention therefore, there is provided an extensible shaft comprising a main tubular part, a cylindrical extension part telescopically located in and engaged with said main part so as to extend co-axially from one end thereof, liquid seal means provided between the extension part inner end and the main part, a butt end piece adapted to close the end of the main part remote from the end through which the extension part extends, said butt end piece incorporating liquid inlet means which can be exposed or opened by adjustment of the butt end piece relative to the main part to permit liquid from an external source to be drawn into the main part on extension of the extension piece, and seal means being provided between the main part and butt end piece so as to prevent escape of liquid from the main part when the butt end piece is adjusted to close the liquid inlet means and lock the extension piece against axial movement relative to the main part.

According to a second aspect of this invention, there is provided a hand spear comprising an extensible shaft having a main tubular part with hand grip means, a cylindrical extension part telescopically located in and engaged with said main part so as to extend co-axially from one end thereof, the outer free end portion of the extension part being formed as or provided with a spear head, liquid seal means provided between the extension piece inner end and the main part, a butt end piece adapted to close the end of the main part remote from the end through which the extension part extends, said butt end piece incorporating liquid inlet means which can be exposed or opened by adjustment of the butt end piece relative to the main part to permit liquid from an external source to be drawn into the main part on extension of the extension piece, and seal means being provided between the main part and butt end piece so as to prevent escape of liquid from the main part when the butt end piece is adjusted to close the liquid inlet means and lock the extension piece against axial movement relative to the main part, and resilient thrust imparting means provided on the spear and arranged to add impetus to a spear thrust by a user.

The preferred aspect of invention will now be described by way of example and with reference to the accompanying drawings in which:

FIG. 1 is a side elevational view of a hand spear with an extensible shaft in accordance with this invention, FIG. 2 is a fragmentary longitudinal sectional view of the spear shown in FIG. 1 and more particularly illustrating the constructional details thereof.

FIG. 3 is a longitudinal sectional view of the spear upper end part but showing an alternative arrangement for locking and sealing the butt end piece, the butt end piece being shown in the unlocked position, and FIG. 4 is a side elevational view of the spear upper end part shown in FIG. 3 but with the butt end piece in the locked and sealed position.

In this preferred application of the invention as an underwater hand spear, the materials utilised are those resistant to corrosion, particularly corrosion by sea water, and the tubular main part 1 and cylindrical extension part 2 may be formed from such as a lightweight aluminium alloy tube material, the diameters being selected so that the extension part 2 is a relatively close sliding fit in the main part 1.

In this application, the outer free end portion of the extension part 2 is provided with a spear head 3, and such spear head 3 is preferably detachably engageable with the extension part, such as by being screw-threadedly engaged, so that the spear head 3 is detachable for safety reasons when not in use and for replacement or exchange with a spear head 3 of different formation, or to facilitate servicing, e.g., hardening and sharpening. As shown in FIG. 2, the free end portion of the extension part 2 can include a solid externally screw-threaded insert piece 4 located and secured in the tubular end of the extension part 2.

The inner end portion of the extension part 2 located within the tubular main part 1 is provided with liquid seal means so that the extension part 2 can act as a piston or plunger in co-operation with the main part 1 in drawing liquid into the main part 1 and sealing such liquid therein to prevent movement of the extension part 2 relative to the main part 1. As illustrated in FIG. 2, the seal means can be provided by at least one neoprene (or other suitable material) sealing ring 5 located in an annular groove of a solid insert piece 6 secured in the inner end of the tubular extension part 2. To ensure that the extension part 2 is maintained rigid relative to the main part, differences in the external diameter of the extension part 2 and internal diameter of the main part 1 can be compensated for by expanding an inner end portion of the extension part to provide an annular rib 7 spaced from the O ring seal 5 and/or providing an annular indent and thus an inner annular rib 8 on the main part towards the end through which the extension part 2 extends.

The main part 1 is also provided towards such end from which the extension part 2 extends with a hand grip means whereby the user may hold the spear, and such hand grip means can be in the form of a rubber or plastic sleeve 9 secured to the outer side of the main part 1, and such sleeve 9 may have a serrated formation or be provided with annular ribs 10. In one arrangement the annular ribs 10 in the sleeve hand grip 9 can be formed by expanding the main tube 1 itself with a series of spaced annular ribs 11 which serve to deform the hand grip sleeve 9 and also assist in maintaining such sleeve 9 in position.

The butt end piece 12 may be generally of cylindrical formation and generally of substantially the same external diameter as the main tubular part 1, and such butt end piece 12 may, as illustrated in FIG. 2 of the drawings, have an externally screw-threaded part 13 arranged for screw-threaded engagement with an interior screw-thread 14 provided in the butt end of the main part 1 so that the butt end piece 12 can be longitudinally adjusted relative to the main part 1 by rotation, and a liquid inlet passage 15 is provided in the screw-threaded inner end portion 13 of the butt end piece 12 so as to open co-axially at the inner end thereof and medially at the side thereof so that when screwed fully home the inlet passage 15 is sealed by the butt end of the main tubular part 1, but unscrewing of the butt end piece 12 relative to the main part 1 will expose the side opening to the liquid inlet passage 15 and permit liquid to be drawn into the tubular main part 1 on extension of the extension part 2, and subsequently ejected from the main part by telescopically collapsing the extension part 2 into the main part 1. The butt end piece 12 may be provided also with a neoprene or like O ring seal 16 or washer at a shouldered portion of the butt end piece 12, and the butt end of the main part 1 may be provided with an internal chamfer or bevel to improve the seal when the butt end piece 12 is screwed fully home.

In a modification of the invention, and as illustrated by way of example in FIGS. 3 and 4 of the drawing, the previously described screw threaded arrangement of the butt end piece 12 can be dispensed with and a bayonet fitting utilised. In this arrangement the butt end piece 12 has an end part 21 of reduced diameter and arranged as a sliding fit within the main tubular part 1, the liquid inlet passage 15 being provided in such butt end part 21 in a similar manner to the previous arrangement, and the end part 21 has a lateral projection 22 such as a peg, stud or screw slidably located in a slot 23 extending generally longitudinally of the main tubular part 1 for a length substantially equal to the amount of longitudinal movement necessary for operation of the butt end piece 12 in opening or closing off the inlet passage 15. There being lateral extensions 23a and 23b (which may extend in opposite directions) of the slot 23 at each end thereof and in which the projection 22 can locate on rotation of the butt end piece 12 relative to the main tubular part 1, or vice versa, to lock the butt end piece 12 in either the fully home sealing position or the inlet passage 15 open position. As before, an O ring seal 16 can be provided on the reduced end part 21 at its junction with the remainder of the butt end piece 12 for sealing engagement with the main tube part when the butt end piece is in the fully home closed or sealing position, and an additional O ring seal 24 can be provided in an annular groove in the inner end portion of the reduced end part.

Thus the shaft, or spear incorporating such shaft, can be normally transported or stored in the collapsed position and subsequently made ready for use by partially unscrewing the butt end piece 12 to expose the water inlet and placing such butt end piece 12 and the butt end of the tubular main part 1, at least, under water; the extension part 2 being then pulled out or telescopically extended so that, by its piston action, water is drawn into the main part 1, and the butt end piece 12 is then either screwed or slid (as the case may be) and locked fully home to seal the water within the main part 1 and lock the shaft in its extended position. It is well-known of course to provide various mechanical locking means for locking two or more telescopically extensible shafts in the extended position, but such mechanical locking devices are not always easy to release or secure firmly and such malfunction of a mechanical locking device is particularly likely to happen in the case of a shaft used under water, and particularly under salt water as salt water commonly causes seizing up or malfunction of mechanical connections. Thus, the present invention is particularly suited for use in the construction of a telescopically extensible underwater hand spear, but it will be seen that the simple and effective and substantially malfunction-proof arrangement can provide a telescopically extensible shaft which may be used for a variety of applications under or above water, e.g., in the construction of a telescopic boat hook.

In the preferred application as an underwater hand spear, the spear if provided with means to add impetus to a thrust or throw by a user, and such means in the present form of invention can be provided by a natural or synthetic rubber loop 17 secured to the butt end piece 12 and arranged to be stretched forwardly towards the hand grip 9 on the main part 1 so that when the hand grip 1 is released on a forward thrust or throw by a user the stretched rubber loop 17, which may be subsequently released from the user's hand or held to prevent loss of the spear, provides the added impetus to the thrust or throw. The rubber loop 17 can be formed from a length of tubular rubber having end portions 17a passing through side apertures 18 in the butt end piece 12 and into a bore 19 thereof, such end portions 17a being locked or wedged in position by a ball wedge member 20 located therebetween as a tight fit compressing the rubber end portions 17a against the inner side wall of the butt end piece 12.

A particular form of invention has been described and illustrated by way of example, but it will be appreciated that other variations of and modifications to the invention can take place without departing from the scope of the appended claims.

The shaft, or spear incorporating the shaft, of this invention is quickly and easily extensible and, in addition to being substantially malfunction-proof, is considerably more rigid in its extended form than conventional telescopic or two or more part jointed shafts or rods.

I claim:

1. An extensible shaft comprising a main tubular part, a cylindrical extension part telescopically located in and engaged with said main part so as to extend co-axially from one end thereof, liquid seal means provided between the extension piece inner end and the main part, a butt end piece adapted to close the end of the main part remote from the end through which the extension part extends, said butt end piece incorporating liquid inlet means which can be exposed or opened by adjustment of the butt end piece relative to the main part to permit liquid from an external source to be drawn into the main part on extension of the extension piece, and seal means being provided between the main part and butt end piece so as to prevent escape of liquid from the main part when the butt end piece is adjusted to close the liquid inlet means and lock the extension piece against axial movement relative to the main part.

2. An extensible shaft as claimed in claim 1 wherein the butt end piece has an externally screw-threaded part arranged for screw-threaded engagement with an interior screw thread provided in the butt end of the main part so that the butt end piece can be longitudinally adjusted relative to the main part by rotation, and a liquid inlet passage is provided in the screw-threaded inner end portion of the butt end piece so as to open at the inner end thereof and medially at one side thereof so that when the butt end piece is screwed fully home the inlet passage is sealed off, but unscrewing of the butt end piece relative to the main part will expose the side inlet to permit liquid to be drawn into the main part on extension of the extension part and subsequently ejected by telescopically collapsing the extension part into the main part.

3. An extensible shaft as claimed in claim 1 wherein the butt end piece has an end part arranged as a sliding and sealing fit within the main tubular part and having a lateral projection slidably located in a slot extending generally longitudinally of the main part, said end part of the butt end piece having a liquid inlet passage opening to the inner end and medially of the side of said end part so that the inlet can be closed off when the said end part is slid inwardly of the main part or exposed when slid outwardly thereof, the main part slot being of a length substantially equal to the amount of longitudinal movement of the butt end piece necessary for operation of the butt end piece in opening or closing the inlet passage side opening, and the slot having a lateral extension at each end wherein the butt end piece lateral projection can locate to lock said butt end piece in either the open or the closed position.

4. A hand spear having telescopically extensible shaft according to claim 1.

5. A hand spear having a telescopically extensible shaft according to claim 2.

6. A hand spear having a telescopically extensible shaft according to claim 3.

7. A hand spear comprising an extensible shaft having a main tubular part with hand grip means, a cylindrical extension part telescopically located in and engaged with said main part so as to extend co-axially from one end thereof, the outer free end portion of the extension part being formed as or provided with a spear head, liquid seal means provided between the extension piece inner end and the main part, a butt end piece adapted to close the end of the main part remote from the end through which the extension part extends, said butt end piece incorporating liquid inlet means which can be exposed or opened by adjustment of the butt end piece relative to the main part to permit liquid from an external source to be drawn into the main part on extension of the extension piece, and seal means being provided between the main part and butt end piece so as to prevent escape of liquid from the main part when the butt end piece is adjusted to close the liquid inlet means and lock the extension piece against axial movement relative to the main part, and resilient thrust imparting means provided on the spear and arranged to add impetus to a spear thrust by a user.

8. A hand spear as claimed in claim 7 wherein said thrust imparting means comprises a natural or synthetic rubber loop secured to the butt end piece for stretching towards the hand grip, the rubber loop being formed from a length of rubber having end portions passing through side apertures in the butt end piece and into a bore thereof, such end portions being wedged in position by a ball wedge member located therebetween as a tight fit compressing the rubber end portions against the bore wall.

9. A hand spear as claimed in claim 7 wherein the hand grip means is provided by a series of annular external ribs on the main tubular part and a rubber or plastics sleeve located over the ribbed portion.

* * * * *